United States Patent
Botta (10) Patent No.: US 6,467,523 B2
(45) Date of Patent: Oct. 22, 2002

(54) LAMINATING APPARATUS (75) Inventor: Klaus Botta, Offenbach (DE)

(73) Assignee: Esselte N.V., Sint-Niklaas (BE)

( * ) Notice: Subject to any disclaimer, the term of this patent is extended or adjusted under 35 U.S.C. 154(b) by 0 days.

(21) Appl. No.: 09/797,739

(22) Filed: Mar. 5, 2001

(65) Prior Publication Data

US 2001/0054486 A1 Dec. 27, 2001

Related U.S. Application Data (63) Continuation of application No. PCT/EP00/06323, filed on Jul. 12, 2000.

(51) Int. Cl.[7] .............................................. B30B 15/00
(52) U.S. Cl. ....................... 156/498; 156/499; 156/555; 156/582; 156/583.1
(58) Field of Search ................ 156/498, 499, 156/555, 580, 582, 583.1

(56) References Cited

U.S. PATENT DOCUMENTS

| 3,874,979 A | | 4/1975 | Hannon ........................ 161/6 |
| 4,519,865 A | | 5/1985 | Bradler et al. ............. 156/256 |
| 5,275,684 A | * | 1/1994 | Marazzi et al. ............. 156/359 |
| 5,679,200 A | * | 10/1997 | Newcomb et al. .......... 156/515 |
| 5,679,208 A | * | 10/1997 | Sperry et al. ............... 156/515 |
| 5,735,997 A | | 4/1998 | Reinders .................... 156/495 |

FOREIGN PATENT DOCUMENTS

| DE | 34 20 428 A1 | 12/1985 |
| EP | 0 116 659 | 8/1984 |
| WO | WO 95/00430 | 1/1995 |
| WO | WO 96/32247 | 10/1996 |

OTHER PUBLICATIONS

Copy of PCT/EP00/06323 (Jul. 13, 1999).

* cited by examiner

Primary Examiner—James Sells
(74) Attorney, Agent, or Firm—Pennie & Edmonds LLP (57) ABSTRACT

The invention relates to a laminating apparatus for sealing or sealing in flat material with the aid of at least one plastic laminating film coated with an adhesive. The laminating apparatus includes a laminating unit and a deposition unit. Lamination is performed as the material passes through a laminating unit, which has at least one pair of rolls with transport rolls driven in opposite senses in the pass direction. To obtain laminates free from curvature, the invention proposes that the transport rolls of the at least one pair of rolls are arranged in pairs at the same height and delimit a nip which can be supplied in a vertically downward pass direction, and in that the deposition unit is arranged underneath the laminating unit.

36 Claims, 5 Drawing Sheets

LAMINATING APPARATUS

CROSS-REFERENCE TO RELATED APPLICATIONS

This application is a continuation of copending International Application No. PCT/EP00/06323, filed Jul. 12, 2000.

FIELD OF THE INVENTION

The invention relates to an apparatus for laminating laminating stock. The laminating stock includes flat material with at least one, preferably transparent, laminating film that is coated on one side with an adhesive as it passes through a laminating unit. The laminating unit has at least one pair of rolls formed by two transport rolls that can be driven in pairs in opposite senses in the pass direction about mutually parallel, horizontally aligned axes of rotation. A deposition unit for the laminate is provided downstream of the laminating unit in the pass direction.

BACKGROUND OF THE INVENTION

Laminating apparatuses of this kind are used to seal or seal in documents, menus, passes, vehicle documents and similar laminating stock and thereby to protect them from dirt, the ingress of water, forgery and destruction. The vast majority of the known laminating apparatuses have a laminating unit which can be supplied horizontally with laminating stock and laminating film. These units have a horizontal delivery surface on the exit side of the apparatus. The delivery surface leads to a deposition surface, which is arranged at a lower level. This deposition surface, for example, may be formed by the support for the laminating apparatus. These horizontally arranged laminating apparatuses are disadvantageous in that they have a large footprint and are therefore only of limited suitability for applications in fixed locations. For this reason, the devices are generally not set up in a fixed location but are assembled and disassembled as required. In addition, a further disadvantage is that the laminate is not adequately supported during the adhesive-curing phase. It therefore bends irreversibly under the action of gravity. When stacking in combination with a horizontal pass, there is often a build-up of laminate on the outlet side and this can only be avoided at the expense of considerable design complexity.

Taking this as a starting point, it is desirable to improve the known laminating apparatus of the type stated above in such a way that the laminate is aligned in one plane in the course of production and cooling and cannot bend irreversibly.

SUMMARY OF THE INVENTION

Curvature or bending of the laminate in the course of production may be avoided if the negative effects of gravity on bending are eliminated. According to the invention, curvature and bending may be avoided if the laminating process and at least part of the cooling of the laminate takes place in a vertical, downward pass direction. To achieve this, the invention proposes that the transport rolls of the at least one pair of rolls are arranged in pairs at the same height and delimit a nip which can be supplied in a vertically downward pass direction, and in that the deposition unit is arranged underneath the laminate outlet of the laminating unit.

It is expedient to arrange above the laminating unit a feed well, which points downwards in a funnel-like manner and can be integrated into the upper housing wall of the laminating device. At the same time, the laminating apparatus can be designed as a roller laminator in which the at least one pair of rolls contains a heating unit or is designed as such. It is advantageous if the heating unit has at least one heating element for heating up at least one of the transport rolls, it being possible for the heating element to be arranged within or outside the associated transport roll.

According to a preferred refinement of the invention, the laminating apparatus may be designed as a plate-type laminator, in which two pairs of rolls are provided and arranged vertically one underneath the other in the pass direction. The upper pair of rolls may be designed as a feed unit and the other, the lower pair, of rolls may be designed as a pressure application unit. A heating unit may be arranged in the region of the spacing between the two pairs of rolls. In this arrangement, the heating unit can have two plate-shaped heating elements, which delimit a vertical pass gap.

To align the laminate emerging from the laminating unit in a precisely vertical manner in the direction of the deposition unit, it may be advantageous additionally to provide, underneath the laminating unit in the pass direction, an alignment unit which delimits a vertical pass gap for the laminate. The alignment unit may have feed surfaces which open in a funnel-like manner into the pass gap. To accelerate the cooling process, the alignment unit can additionally be equipped with heat transfer surfaces, which are provided with cooling ribs and/or can be supplied with a coolant or refrigerant.

To allow adaptation to laminates of different thicknesses, it is advantageous if the width of the nip and/or of the pass gap between the plate-shaped heating elements and/or in the alignment unit is adjustable against the force of a spring. This adjustment may preferably occur automatically. To avoid curvature during lamination, the alignment unit can be adjusted horizontally as a whole.

In a further preferred refinement of the invention, the deposition unit has a flat supporting surface for receiving a broad side of the laminate. The supporting surface may be aligned obliquely at an acute angle to the vertical pass direction and may merge at its lower end into a standing surface for the lower edge of the laminate. The standing surface may project essentially perpendicularly beyond the supporting surface. It is expedient if the deposition unit is arranged to intersect the vertical exit plane formed by the laminate emerging from the laminating unit. A line of contact for the lower edge of the laminate is preferably arranged above the standing surface. This ensures that, from the laminate exit and the alignment unit, the laminate initially moves downwards freely under the action of gravity without touching the supporting surface and is substantially cooled along this path. Only when the lower edge of the laminate strikes the supporting surface in the region of the line of contact is the laminate deflected from its vertical direction of fall and tipped in a defined manner in the direction of the supporting surface. If the tipping angle is small enough, no permanent bending occurs. For this reason, it is expedient if, starting from the line of contact, the supporting surface and the exit plane enclose an angle of 5° to 45°, more preferably 8° to 15°. To prevent the lower edge of the laminate from sliding outwardly off the standing surface, it is preferred if the standing surface is bent upwards at its outer edge, the edge opposite the supporting surface. To allow stacking, the flat supporting surface is furthermore arranged with its upper edge, that opposite the standing surface, at a lateral distance from the laminate outlet of the laminating unit.

To enable the laminating apparatus according to the invention to be accommodated in a fixed location while taking up as little space as possible, it is expedient to provide a housing which can be fixed on a vertical wall surface and/or, on the narrow side, has a standing surface to allow it to be placed on a horizontal support. The housing preferably has an abutment surface for at least one plug-in, screw-type or clamping element that can be fixed on the support.

The laminating apparatus according to the invention is suitable for the automatic supply of the raw laminate comprising the laminating stock and the laminating film without taking up a relatively large amount of space. For this purpose, a feed device is arranged at the top of the laminating unit and intended to supply the raw laminate, preferably in an automatic manner and preferably in a vertical direction,.

The laminating apparatus according to the invention can be used to particular advantage for sealing in laminating stock consisting of flat material between two laminating films. The laminating films may be connected to one another at one edge to form a pouch and coated with the adhesive on at least one of their mutually facing broad sides.

In the case of a hot laminator, a hot-melt adhesive may be used as the adhesive. Cold lamination can also be performed with advantage using the measures according to the invention, use being made of a laminating film which is coated on one broad side with a pressure-sensitive adhesive. If the laminating films are somewhat larger than the laminating stock, it is sufficient if only one of the two pouch-forming laminating films is coated with adhesive. In this case, the laminating films are additionally bonded all the way around their periphery, which projects beyond the laminating stock. The laminating stock is, thus, sealed in also on the non-adhesive side of the laminate.

The apparatus for laminating a laminating stock includes a laminating unit and a deposition unit. The laminating unit has at least one pair of rolls driven in pairs in opposite senses for passing laminating stock therebetween to form a laminated material. At least one of the pair of rolls delimits a nip. The deposition unit is positioned substantially below and downstream of the laminating unit for depositing the laminated material. The pair of rolls is configured and dimensioned such that the laminating stock passes through the rolls in a vertical pass direction and the laminating stock enters the deposition unit in a vertical pass direction.

The laminating stock may include a flat material to be laminated and at least one laminating film. The laminating film may be transparent and coated on one side with an adhesive. The pair of rolls may include two transport rolls that are positioned on mutually parallel, horizontally aligned axes of rotation. The rolls are positioned at the same height.

A heating unit may also be included. The pair of rolls may be associated with the heating unit. The heating unit may include two plate-shaped heating elements that delimit a heating unit vertical pass gap through which the laminating stock travels.

The at least one pair of rolls may include an upper pair of rolls and a lower pair of rolls. The lower pair of rolls is positioned below the upper pair of rolls in the vertical pass direction and the upper pair of rolls operates as a feed unit while the lower pair of rolls operates as a pressure unit. The upper and lower pair of rolls are arranged to provide a region of spacing between them and the heating unit may be positioned in the region of spacing.

An alignment unit may be provided which delimits an alignment unit vertical pass gap for the laminated material to pass therethrough. The alignment unit is positioned substantially beneath the laminating unit in the vertical pass direction. The alignment unit may include at least one funnel-like feed surface that opens into the alignment unit vertical pass gap. The alignment unit may also include a heat transfer surface supplied with a 35 coolant or refrigerant. The heat transfer surface may be a rib.

The deposition unit may have a flat supporting surface for receiving the laminated material. The supporting surface may be aligned obliquely at an acute angle to the vertical pass direction, merging at its lower end into an essentially perpendicularly projecting standing surface for receiving a lower edge of the laminated material.

In another embodiment of the invention, the apparatus for laminating a laminating stock may include a laminating unit and a deposition unit. The laminating unit has at least one pair of rolls driving in pairs in opposite senses for passing laminating stock therebetween in the vertical pass direction to form a laminated material. The deposition unit is positioned substantially below the laminating unit for depositing the laminated material and includes a supporting surface for receiving the laminated material. The supporting surface may be slanted at an acute angle relative to the vertical pass direction. The at least one pair of rolls is configured and dimensioned such that the laminating stock passes through the rolls in a vertical pass direction and the laminated stock enters the deposition unit in a vertical pass direction.

The supporting surface of the deposition unit is substantially flat and includes a standing surface positioned to project substantially perpendicularly at the lower end of the supporting surface. The standing surface receives the lower edge of the laminated material and the supporting surface receives a broad side of the laminated material. The laminated material exits the laminating unit in a vertical exit plane and the supporting surface of the deposition unit intersects the vertical exit plane of the laminated material on a line of contact positioned above the standing surface. The supporting surface of the deposition unit is positioned at an angle of about 5° and 45° relative to the vertical exit plane of the laminated material. The angle of the supporting surface of the deposition unit relative to the vertical exit plane of the laminated material ranges from about 8° to 15°. The standing surface includes a portion that is bent upwardly at its outer edge and the upper end of the supporting surface may be spaced relative to an outlet of the laminating unit.

BRIEF DESCRIPTION OF THE DRAWINGS

Preferred features of the present invention are disclosed in the accompanying drawings, wherein identical reference characters denote like elements throughout the several views, and wherein:

FIGS. 2a to 2e show the laminating apparatus of FIG. 1 in various pass positions of the laminate;

DETAILED DESCRIPTION OF THE DRAWINGS

The laminating apparatus illustrated in the drawings is intended especially for sealing in laminating stock 10 comprising flat material, such as paper, board or fabric, between two laminating films 14. The laminating films may be connected to one another at one edge 12 in the manner of a pouch and are preferably composed of transparent plastic, or similar laminating material. The mutually facing broad-side surfaces 16 of the laminating films 14 are coated with an adhesive on their mutually facing broad sides.

Figure 1:
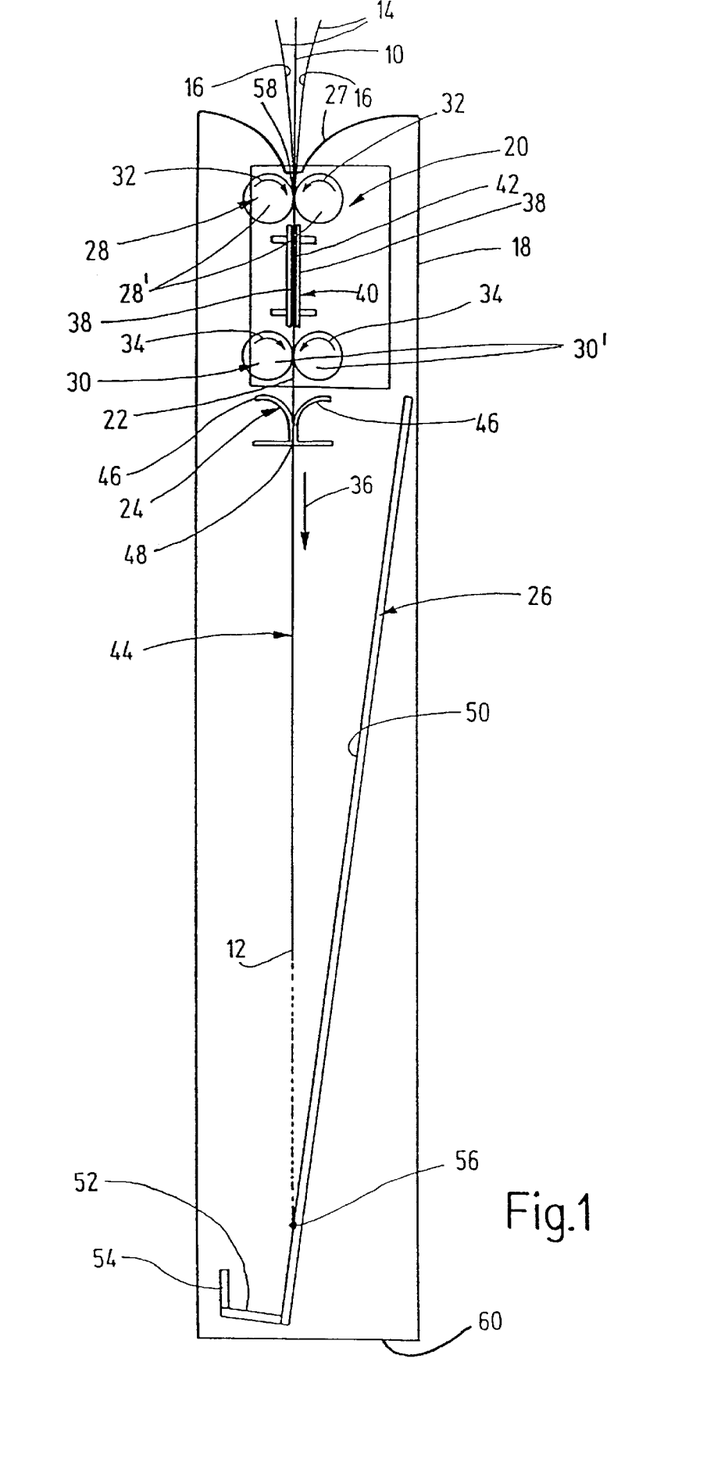
FIG. 1 shows a side view of a laminating apparatus with a vertical laminate pass direction.

The laminating apparatus includes a housing 18, a laminating unit 20 arranged at the top of the housing 18, an alignment unit 24 arranged underneath the exit point 22 of the laminating unit 20, and a deposition unit 26 arranged underneath the laminating unit and the alignment unit. As shown in FIG. 1, a feed well 27 is arranged above the laminating unit 20. In the embodiment shown, the feed well 27 points downwards in the manner of a funnel and is integrated into the upper housing wall.

The laminating stock 10 moves through the laminating apparatus in a direction that is referred to herein as the "pass direction." Pass direction is defined as the direction of movement of the laminating stock 10. A preferred pass of the laminating stock 10 occurs in a vertical direction.

The laminating unit 20 illustrated in FIG. 1 comprises two pairs 28, 30 of rolls, which are arranged one underneath the other with a vertical spacing therebetween. Each of the rolls may be used as transport rolls 28', 30', which are each arranged at the same height and can be driven by motor or by hand, with a hand crank for example, in opposite senses in the direction of the arrows 32, 34 in a vertical pass direction 36. In the region of the spacing between the two pairs 28, 30 of rolls there is a heating unit 40, which comprises two plate-shaped heating elements 38 and delimits a vertical pass gap 42 for the laminate 44 comprising the laminating stock 10 and the laminating films 14. The upper pair 28 of rolls forms a feed unit, while the lower pair 30 of rolls forms a pressure application unit.

In the heating unit 40, the hot-melt adhesive on the laminating films 16 is melted. This allows the laminating films 14 to be bonded to the laminating stock 10 in the pressure application unit formed by the pair of rolls 30.

Figure 5A:
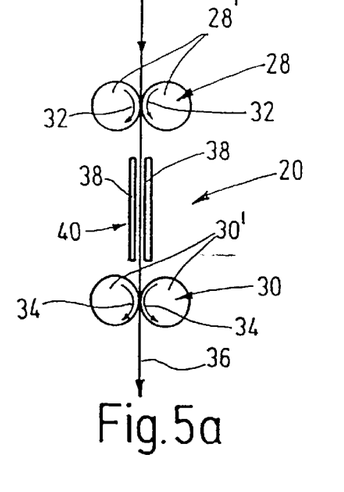
FIGS. 5a to 5i show various variant embodiments of the laminating unit.
Figure 5B:
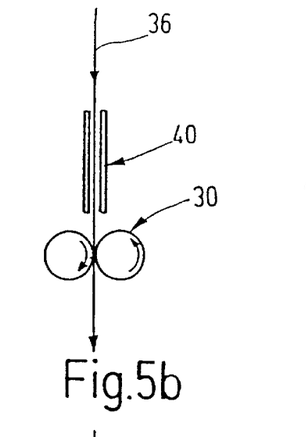

The laminating unit shown in FIG. 1, which is shown again on a larger scale in FIG. 5a, can be modified in various different ways, as can be seen from FIGS. 5b to 5h. In the exemplary embodiment shown in FIG. 5b, the pair 28 of rolls on the feed side has been omitted; on the feed side, the raw laminate is fed directly into the pass gap 42 of the heating unit 40 and, from there, passes to the pair 30 of rolls in the pass direction 36.

Figure 5C:
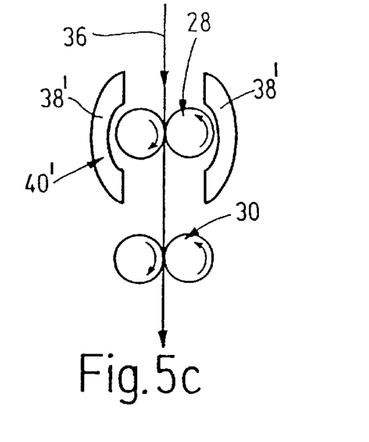

In the exemplary embodiment shown in FIG. 5c, two pairs 28, 30 of rolls are provided, the transport rolls 28' of the upper pair 28 of rolls being heated from the outside by the heating elements 38' and forming a heating unit 40' with these elements. Here too, the lower pair 30 of rolls performs the function of a pressure application unit.

Figure 5D:
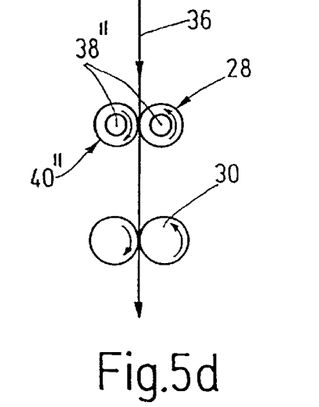
Figure 5E:
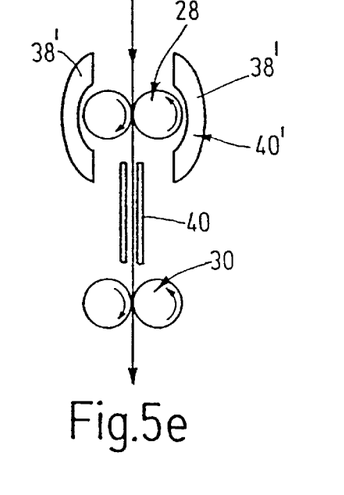
Figure 5F:
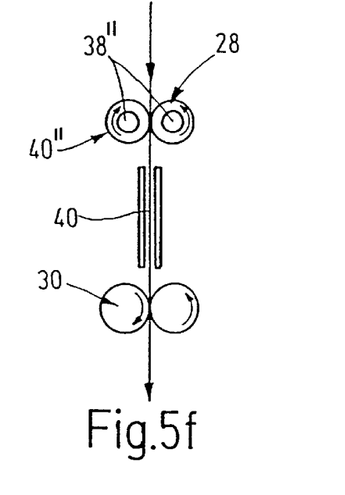

The variant embodiment shown in FIG. 5d corresponds to the embodiment shown in FIG. 5c, the only difference being that the heating elements 38" are arranged within the transport rolls 28" and form the heating unit 40" together with the rolls. In the variant embodiments shown in FIGS. 5e and 5f, a plate-type heater 40 is provided in addition to the heating units 40', 40" comprising the rolls 28' and the heating elements 38' and 38", respectively.

Figure 5G:
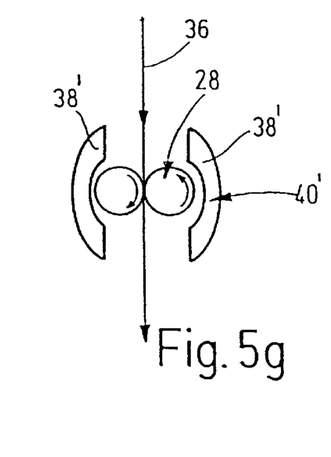
Figure 5H:
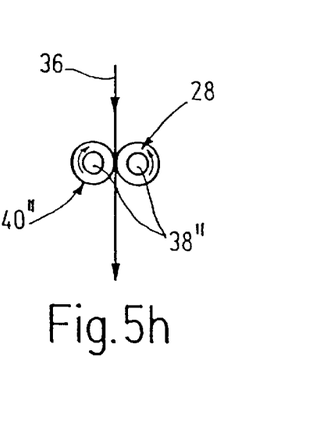

The variant embodiments shown in FIGS. 5g and 5h contain a single pair 28 of rolls, which simultaneously perform a feeding function, a pressure application function and a heating function. For this purpose, the transport rolls 28' in the exemplary embodiment shown in FIG. 5g are heated by externally arranged heating elements 38', while those shown in FIG. 5h are heated by internal heating elements 38".

Figure 5I:
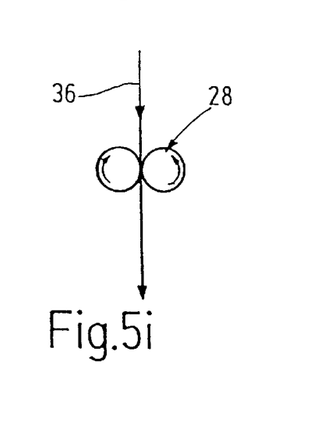

The laminating unit 20 shown in FIG. 5i contains just one pair 28 of rolls, which has a pressure application function, but no heating function. It is part of a cold laminator for processing laminating films coated with a pressure-sensitive adhesive.

Common to all the embodiments shown in FIGS. 5a to 5i is that the laminating process takes place in a vertical pass direction 36, from the top downwards.

In the alignment unit 24 situated underneath the laminating unit 20, the still warm laminate 44 is guided by the funnel-like walls 46 into a pass gap 48 and aligned in a vertical manner in the latter. To ensure rapid cooling of the laminate, the walls of the alignment unit 24 can be provided with cooling ribs (not shown) and/or can be supplied with a coolant or refrigerant.

The deposition unit 26 has a supporting surface 50, which is aligned obliquely at an acute angle to the pass direction 36 and, at its lower end, merges into a standing surface 52 for the lower edge 12 of the laminate 44. The standing surface 52 projects beyond the supporting surface 50 and is bent upwards at its outer edge 54. The supporting surface 50 is aligned and arranged obliquely relative to the laminating unit 20 in such a way that the lower edge of the laminate 44 emerging from the laminating unit makes contact with the supporting surface 50 at a contact line 56 arranged above the standing surface 52.

Figure 2A:
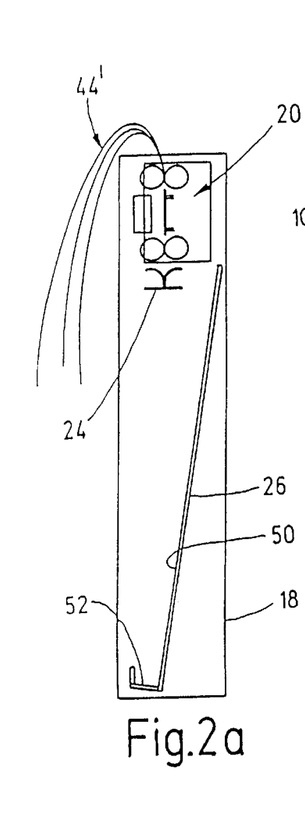
Figure 2C:
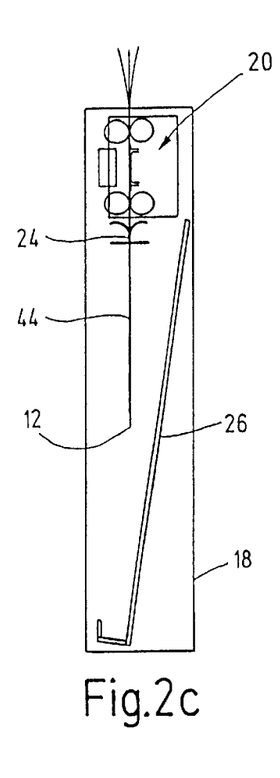
Figure 2D:
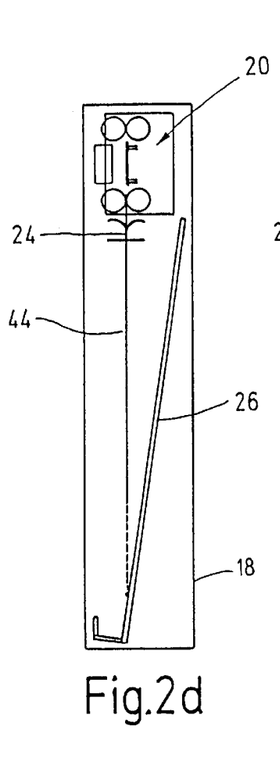
Figure 2E:
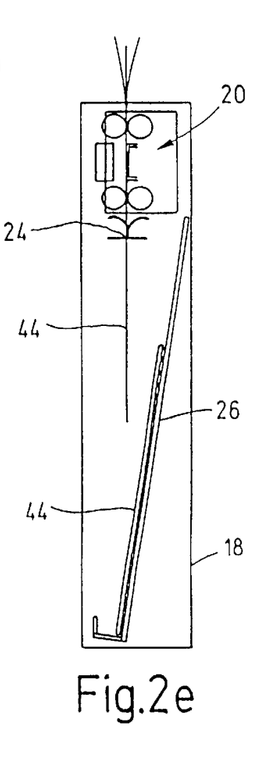

As can be seen from FIGS. 1 and 2a to 2e, the raw laminate comprising the laminating stock 10 and the laminating films 14 is introduced into the nip 58 (shown in FIG. 1) between the transport rolls 28' of the upper pair 28 of rolls from above by its closed lower edge 12 and is grasped by this pair of rolls in the pass direction 36 (FIG. 2a). The raw laminate can then be released, so that it overhangs on one side. From the pair 28 of rolls, the laminate 44 reaches the pass gap 42 of the heating unit 40. As it passes through the heating unit 40, the hot-melt adhesive on the broad sides 16 of the laminating films 14 is melted, so that, as it passes on through the lower pair 30 of rolls, the laminating films 14 are pressed against the laminating stock 10 and bonded to the latter over its surface. From the exit point 22 of the lower pair 30 of rolls, the laminate 44 passes via the funnel-shaped walls 46 into the pass gap 48 of the alignment unit 24. There, the laminate 44 is aligned vertically and simultaneously cooled (FIGS. 2b and c). From the alignment unit 24, the laminate 44 moves freely downwards under the effect of gravity until, after being released by the pair of rolls 30, it strikes the contact line 56 of the supporting surface 50 of the deposition unit 26. From there, the laminate 44 is guided with its lower edge onto the standing surface 52 (FIG. 2d). During this process, the laminate 44 is tipped towards the supporting surface 50 and rests flat on the latter. As can be seen from FIG. 2e, further laminates 44 can be formed and stacked in the deposition unit 26 without being impaired by the previous laminates.

As can be seen from FIGS. 3a to 3e, the vertical laminator described has only a relatively small footprint. It can be set up in a fixed manner with its narrow bottom side face 60 on a support 62. To increase its stability, at least one supporting element 64 may be provided.

Figure 3A:
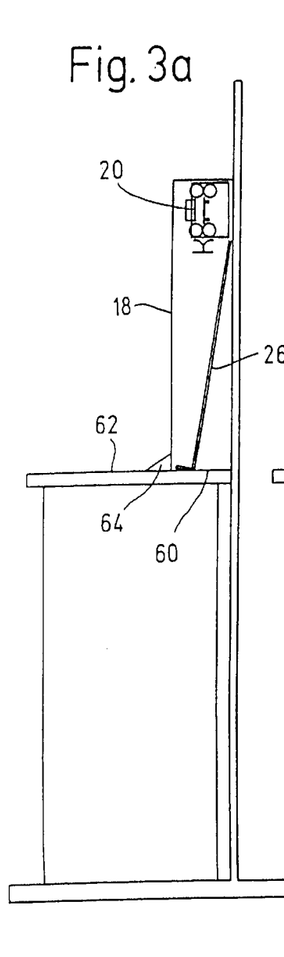
FIGS. 3a to 3e show various set-up options for the laminating apparatus of FIG. 1.
Figures 3B, 3C, 3D:
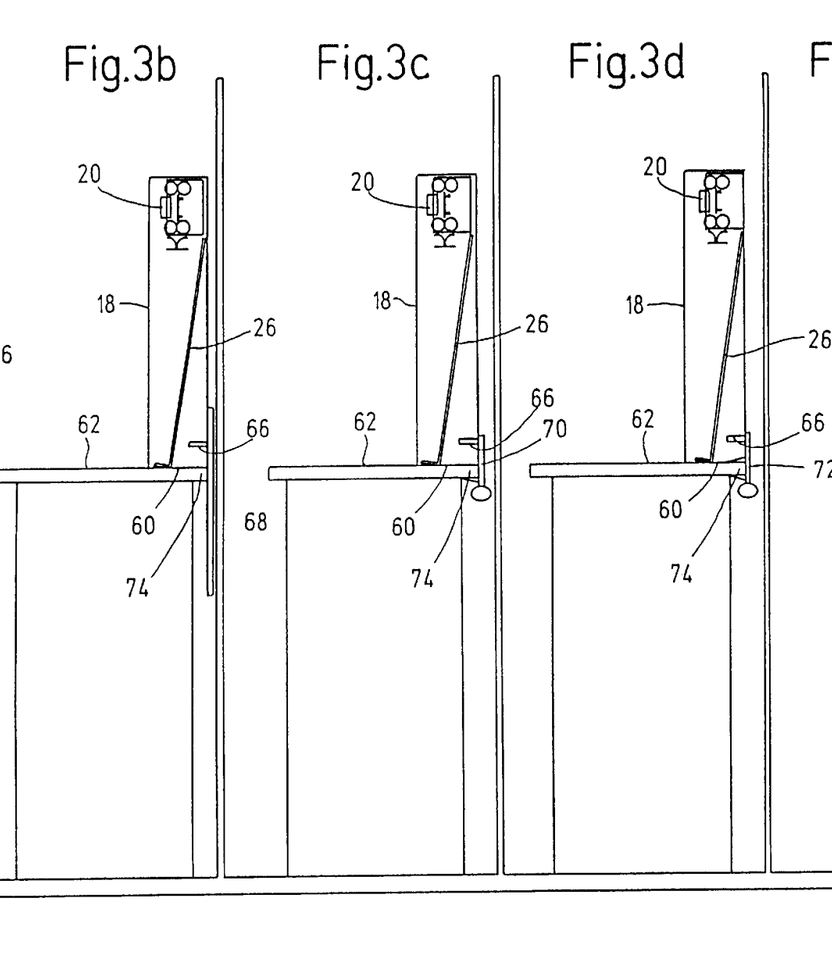
Figure 3E:
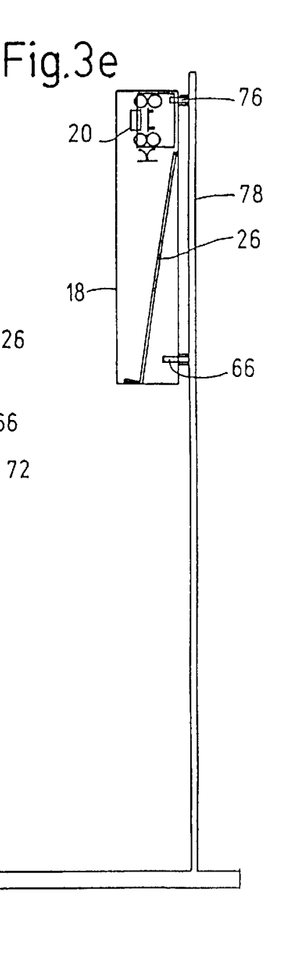

In the exemplary embodiments shown in FIGS. 3b, 3c and 3d, the laminating apparatus is shown with its narrow side face 60 on a support 62. The apparatus has been fixed at the edge 74 of the support by way of an abutment 66 in combination with a plug-in plate 68 (FIG. 3b), a screw clamp 70 (FIG. 3c), or a lever-type clamp 72 (FIG. 3d). In the embodiment shown in FIG. 3e, the housing 18 of the laminating apparatus is fixed on a vertical wall 78 using suitable fastening elements 76.

Figure 4A:
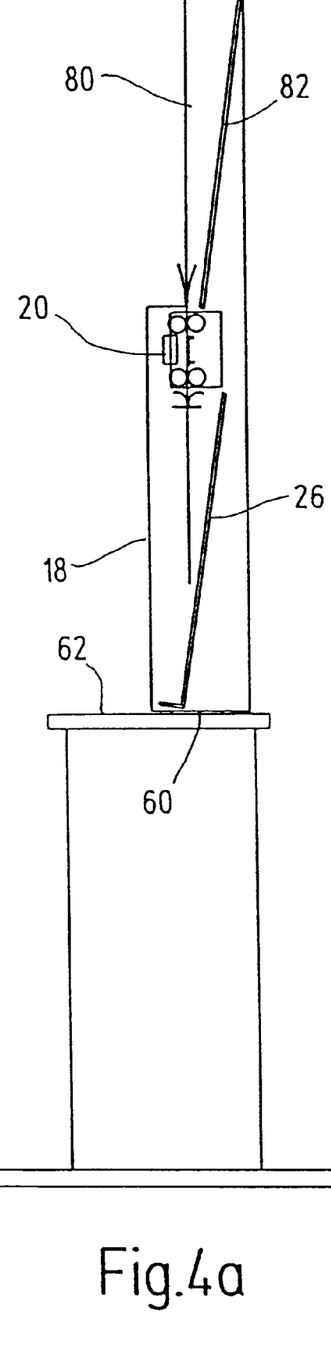
FIGS. 4a and 4b show two versions of a laminating apparatus with a feed unit.
Figure 4B:
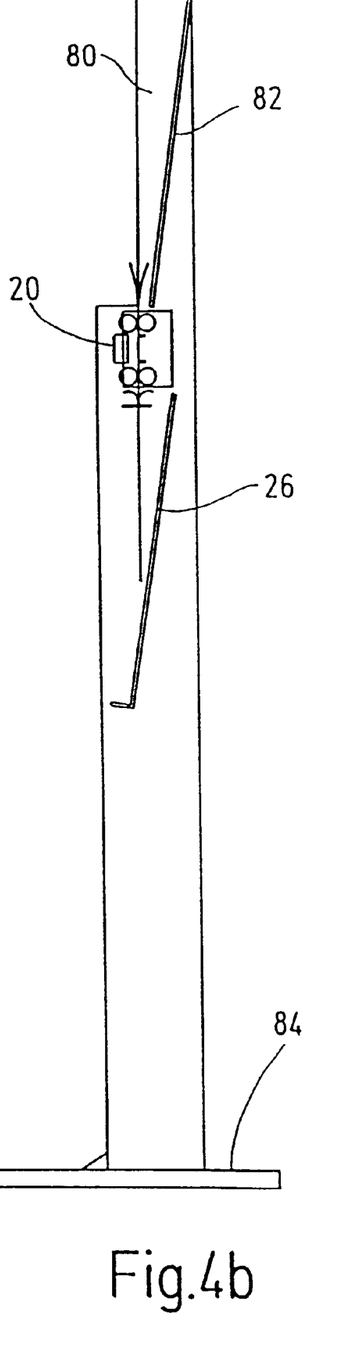

In the embodiments shown in FIGS. 4*a* and 4*b*, a feed unit 80 is mounted on the laminating apparatus. By utilizing this feed unit, the prefabricated raw laminates can be fed to the laminating unit 20 by hand or automatically in the region of the upper pair 28 of rolls, with the lower edge 12 pointing downwards. For this purpose, the feed unit 80 has a magazine 82 with an oblique supporting surface. Otherwise, the embodiments shown in FIGS. 4*a* and 4*b* differ only in that, in the first case, the laminating apparatus and feed unit are set up on a desktop 62 while, in the latter case, a stand 86 is provided. Stand 86 extends as far as the floor 84.

In summary, the invention relates to a laminating apparatus for sealing or sealing in flat material with the aid of at least one plastic laminating film 14 coated with an adhesive. Lamination is performed as the material passes through a laminating unit 20 which has at least one pair 28, 30 of rolls with transport rolls 28', 30' driven in opposite senses in the pass direction. To obtain laminates free from curvature, the invention proposes that the transport rolls 28', 30' of the at least one pair 28, 30 of rolls should be arranged in pairs at the same height and should delimit a nip 58 that can be supplied in a vertically downward pass direction 36, and that a deposition unit 26 should be arranged underneath the laminating unit 20.

While various descriptions, embodiments, and aspects of the present inventions are described above, it should be understood that the various features can be used singly or in any combination thereof. Each of the separate embodiments of the Figures may be used in conjunction with or side-by-side with the other embodiments. Therefore, this invention is not to be limited to only the specifically preferred embodiments depicted herein.

Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention.

What is claimed is:

1. An apparatus for laminating a laminating stock comprising:
    a laminating unit having at least one pair of rolls driven in pairs in opposite senses for passing laminating stock therebetween to form a laminated material, at least one of said at least one pair of rolls delimiting a nip; and
    a deposition unit positioned substantially below and downstream of the laminating unit for depositing the laminated material,
        wherein the at least one pair of rolls is configured and dimensioned such that the laminating stock passes through the rolls in a vertical pass direction and the laminated stock enters the deposition unit in a vertical pass direction,
        the apparatus further comprising an alignment unit, which delimits an alignment unit vertical pass gap for the laminated material to pass therethrough, said alignment unit being positioned substantially beneath the laminating unit in the vertical pass direction.

2. The apparatus of claim 1, wherein the laminating stock includes a flat material to be laminated and at least one laminating film, said laminating film being transparent and coated on one side with an adhesive.

3. The apparatus of claim 1, wherein the at least one pair of rolls include two transport rolls that are positioned on mutually parallel, horizontally aligned axes of rotation, said at least one pair of rolls being positioned at the same height.

4. The apparatus of claim 1, wherein the laminating unit further comprises a heating unit.

5. The apparatus of claim 4, wherein the at least one pair of rolls is associated with the heating unit.

6. The apparatus of claim 5, wherein the heating unit includes at least one heating element for heating up at least one of the rolls in the pair of rolls.

7. The apparatus of claim 6, wherein the heating element is provided either inside or outside of the at least one roll in the at least one pair of rolls.

8. The apparatus of claim 1, wherein the at least one pair of rolls comprises an upper pair of rolls and a lower pair of rolls, and the lower pair of rolls is positioned below the upper pair of rolls in the vertical pass direction, with the upper pair of rolls being configured and dimensioned to operate as a feed unit and the lower pair of rolls configured and dimensioned to operate as a pressure application unit.

9. The apparatus of claim 8, wherein the upper and lower pair of rolls are arranged to provide a region of spacing between them and the heating unit is positioned substantially in the region of spacing.

10. The apparatus of claim 4, wherein the heating unit comprises two plate-shaped heating elements which delimit a heating unit vertical pass gap through which the laminating stock travels.

11. The apparatus of claim 1, wherein the alignment unit includes at least one funnel-like feed surface that opens into the alignment unit vertical pass gap.

12. The apparatus of claim 1, wherein the alignment unit further comprises at least one heat transfer surface supplied with either a coolant or a refrigerant.

13. The apparatus of claim 12, wherein the at least one heat transfer surface is a rib which is configured to carry the coolant or refrigerant.

14. The apparatus of claim 1, wherein the alignment unit is configured and dimensioned to allow adjustment of said unit.

15. The apparatus of claim 1, wherein the alignment unit further comprises an adjustment mechanism for automatically adjusting the width of the alignment unit vertical pass gap.

16. The apparatus of claim 1, wherein the deposition unit has a flat supporting surface for receiving the laminated material, the supporting surface being aligned obliquely at an acute angle to the vertical pass direction and merging at its lower end into an essentially perpendicularly projecting standing surface for receiving a lower edge of the laminated material.

17. The apparatus of claim 1, further comprising a housing configured and dimensioned to allow fixation of the laminating apparatus to a vertical wall surface.

18. The apparatus of claim 17, wherein the housing includes a narrow side that is configured and dimensioned for association with a horizontal support.

19. The apparatus of claim 18, wherein the housing is associated with an abutment for affixing the laminating apparatus to the horizontal support, said abutment including a plug-in, screw-type, or clamping element.

20. The apparatus of claim 1, further comprising a feed unit positioned at the entrance of the laminating unit, said feed unit being configured and dimensioned to automatically vertically supply a raw laminate stock to the laminating unit.

21. The apparatus of claim 20, wherein the feed unit includes a feed well having a funnel-like portion that points downwardly in a funnel-like manner.

22. The apparatus of claim 21, further comprising a housing configured and dimensioned to allow fixation of the laminating apparatus to a vertical wall surface, wherein the feed well is coupled to a portion of housing.

23. An apparatus for laminating a laminating stock comprising: a laminating unit having at least one pair of rolls driven in pairs in opposite senses for passing laminating stock therebetween in a vertical pass direction to form a laminated material; and a deposition unit positioned substantially downstream of the laminating unit for depositing the laminated material, said deposition unit including a supporting surface for receiving the laminated material, the supporting surface being slanted at an acute angle relative to the vertical pass direction, wherein the at least one pair of rolls is configured and dimensioned such that the laminating stock passes through the rolls in a vertical pass direction and the laminated stock enters the deposition unit in a vertical pass direction.

24. The apparatus of claim 23, wherein the supporting surface is substantially flat and includes a standing surface positioned to project substantially perpendicularly at the lower end of the supporting surface, said standing surface for receiving a lower edge of the laminated material and said supporting surface for receiving a broad side of said laminated material.

25. The apparatus of claim 24 wherein the laminated material exits the laminating unit in a vertical exit plane and the supporting surface of the deposition unit intersects the vertical exit plane of the laminated material on a line of contact positioned above the standing surface.

26. The apparatus of claim 25, wherein the supporting surface of the deposition unit is positioned at an angle of about 5° to 45° relative to the vertical exit plane of the laminated material.

27. The apparatus of claim 26, wherein the angle of the supporting surface of the deposition unit relative to the vertical exit plane of the laminated material ranges from about 8° to 15°.

28. The apparatus of claim 23, wherein the standing surface includes a portion that is bent upwardly at its outer edge.

29. The apparatus of claim 23, wherein an upper end of the supporting surface is spaced relative to an outlet of the laminating unit.

30. An apparatus for laminating a laminating stock comprising:

a laminating unit comprising a first pair of rolls configured and dimensioned such that the laminating stock passes through the rolls in a substantially downward direction, wherein the rolls delimit a nip and are adapted to rotate in opposite senses for passing laminating stock therebetween in a substantially downward direction to form a laminated material;

a means for directly or indirectly heating at least a portion of the laminating stock;

a means for aligning the laminated material, said means for aligning the laminated material being disposed in a substantially downward direction from the nip so that, from the laminate unit to the means for aligning the laminated material, the laminate moves downwards freely under the action of gravity without touching a supporting surface and is substantially cooled along this path;

a deposition unit for receiving the laminated material, said deposition unit being positioned substantially below and downstream of the means for aligning the laminated material.

31. The apparatus of claim 30 wherein the laminating unit additionally comprises a second pair of rolls configured and dimensioned such that the laminating stock or laminated material passes through the second pair of rolls in a substantially downward direction, wherein the second pair of rolls delimit a nip.

32. The apparatus of claim 30 wherein the laminating unit additionally comprises a second pair of rolls configured and dimensioned such that the laminating stock or laminated material passes therebetween, wherein at least one pair of rolls is driven in opposite senses for passing laminating stock therebetween in the vertical pass direction and wherein at least one pair of rolls is adapted to apply pressure to the laminated material.

33. The apparatus of claim 30 wherein the first pair of rolls additionally comprises adjustment means to adjust the thickness between the rolls, thereby allowing for different thicknesses of laminating stock.

34. The apparatus of claim 30 wherein the deposition unit comprises a substantially flat supporting surface and a standing surface at the lower end of the supporting surface and positioned to project substantially perpendicularly to the supporting surface for receiving the laminated material, the supporting surface being slanted at an angle of between about 5° to about 45° relative to vertical.

35. The apparatus of claim 30, wherein the means for aligning the laminated material comprises a vertical pass gap for the laminated material to pass therethrough, and further comprises an adjustment mechanism for adjusting the width of the vertical pass gap.

36. The apparatus of claim 30, wherein the means for aligning the laminated material further comprises a means to cool the laminated material.

* * * * *